United States Patent [19]
Chinn

[11] 3,878,251
[45] Apr. 15, 1975

[54] (1S,2S,5S)-2-HYDROXY-5-(6-METHOXY-2-NAPHTHYL-ALPHA, ALPHA, 1-TRIMETHYLCYCLOPENTANEETHANOL

[75] Inventor: Leland J. Chinn, Morton Grove, Ill.
[73] Assignee: G. D. Searle & Co., Chicago, Ill.
[22] Filed: June 18, 1973
[21] Appl. No.: 370,837

[52] U.S. Cl............ 260/613 R; 424/341; 260/343; 260/520; 260/343.6; 260/473 F
[51] Int. Cl............................................ C07c 43/20
[58] Field of Search..................... 260/613 D, 613 R

[56] References Cited
OTHER PUBLICATIONS
Brain et al., J. Chem. Soc. (C), pp. 3846–3851, (1971).
Bentley, J. Chem. Soc., pp. 2398–2402, (1955).
Chinn et al., J. Org. Chem., 27, pp. 1733–1741, (1962).
Cambie et al., J. Chem. Soc. (C), pp. 2603–2608, (1968).

*Primary Examiner*—Bernard Helfin
*Assistant Examiner*—Nicky Chan
*Attorney, Agent, or Firm*—John M. Brown

[57] ABSTRACT

Preparation and the unexpected estrogenic activity of (1S,2S,5S)-2-hydroxy-5-(6-methoxy-2-naphthyl)-α,α,1-trimethylcyclopentaneethanol are disclosed.

1 Claim, No Drawings

(1S,2S,5S)-2-HYDROXY-5-(6-METHOXY-2-NAPHTHYL-ALPHA, ALPHA, 1-TRIMETHYLCYCLOPENTANEETHANOL

This invention relates to (1S,2S,5S)-2-hydroxy-5-(6-methoxy-2-naphthyl)-α,α,1-trimethylcyclopentaneethanol, and to processes for the preparation thereof. The said product, which can be depicted by the formula

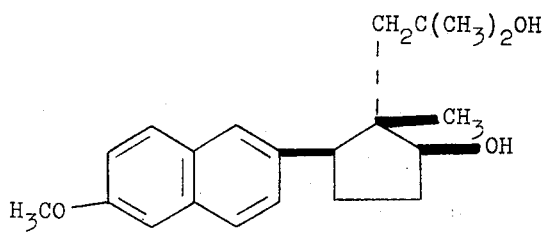

is useful because of its estrogenic activity. In the standardized test for such activity described in U.S. Pat. No. 3,501,506, (1S,2S,5S)-2-hydroxy-5-(6-methoxy-2-naphthyl)-α,α,1-trimethylcyclopentaneethanol is active at a dose of 1 mg. when administered subcutaneously. Those skilled in the art will recognize that observations of activity in standardized tests for particular biological effects are fundamental to the development of valuable new drugs, both veterinary and human.

The estrogenicity of the product of this invention is wholly unforeshadowed by the prior art. Both (1S,2S,5R)-2-hydroxy-5-(6-methoxy-2-naphthyl)-α,α,2-trimethylcyclopentaneethanol and its 2-epimer, which are isomers of the instant product described in J. Org. Chem., 27, 1733 (1962), have been found to be inactive at 1 mg. subcutaneously in the aforesaid test. Likewise found inactive in this test are (1S,2R,5R)-2-ethyl-2-hydroxy-5-(6-methoxy-2-naphthyl)-α,α-dimethylcyclopentaneethanol, an adjacent homolog of the latter prior art compound prepared by contacting (1S,2R,5S)-2-ethynyl-2-hydroxy-5-(6-methoxy-2-naphthyl)cyclopentaneacetic acid lactone [J. Org. Chem., loc. cit.] with methylmagnesium bromide in ethyl ether, hydrolyzing the resultant Grignard complex with dilute hydrochloric acid to produce (1S,2R,5R)-2-ethynyl-2-hydroxy-5-(6-methoxy-2-naphthyl)-α,α-dimethylcyclopentaneethanol, and hydrogenating the latter compound at up to 3 atmospheres over palladium-on-charcoal. Also inactive at 1 mg. subcutaneously in the foregoing test are (1S,2S, 5R)-2-ethyl-2-hydroxy-5-(6-methoxy-2-naphthyl)-α,α,1-trimethylcyclopentaneethanol, the 2-ethyl analog of the product of this invention; and (1S,2R,5S)-2-ethyl-2-hydroxy-5-(6-methoxy-2-naphthyl)-α,α,1-trimethylcyclopentaneethanol, the 2-epimer of the latter compound. (1S,2S,5R)-2-Ethyl-2-hydroxy-5-(6-methoxy-2-naphthyl)-α, α-1-trimethylcyclopentaneethanol can be prepared by resolving d,l-5-(6-methoxy-2-naphthyl)-1-methyl-2-oxocyclopentaneacetic acid [the product of Example 4 in S. Africa 67/2807] with an optically active base, contacting the resultant (1S,5S) enantiomer with ethylmagnesium bromide and acetylene in tetrahydrofuran, hydrolyzing the Grignard complex so formed with dilute sulfuric acid, and contacting the resultant (1S,2S,5S)-2-ethynyl-2-hydroxy-5-(6-methoxy-2-naphthyl)-1-methylcyclopentaneacetic acid with 2,2-dimethoxypropane to afford the methyl ester, from which the desired product eventuates by consecutive treatment with methylmagnesium bromide and dilute hydrochloric acid to produce (1S,2S,5S)-2-ethynyl-2-hydroxy-5-(6-methoxy-2-naphthyl)-α,α,1-trimethylcyclopentaneethanol and hydrogenation of the latter compound at up to 3 atmospheres over palladium-on-charcoal. (1S,2S,5S)-2-Ethyl-2-hydroxy-5-(6-methoxy-2-naphthyl)-α,α,1-trimethylcyclopentaneethanol can be prepared by hydrogenating (1S,2S,5S)-2-ethynyl-2-hydroxy-5-(6-methoxy-2-naphthyl)-1-methylcyclopentaneacetic acid at up to 3 atmospheres over palladium-on-charcoal, epimerizing the substituents on carbon atom number 2 of the cyclopentane ring in the (1S,2S,5S)-2-ethyl-2-hydroxy-5-(6-methoxy-2-naphthyl)-1-methylcyclopentaneacetic acid thus obtained by warming in a 10 percent solution (V/V) of sulfuric acid in tetrahydrofuran, and consecutively treating the resultant (1S,2R,5S)-2-ethyl-2-hydroxy-5-(6-methoxy-2-naphthyl)-1-methylcyclopentane acetic acid lactone with methylmagnesium bromide and dilute hydrochloric acid as above.

The preparation of (1S,2S,5S)-2-hydroxy-5-(6-methoxy-2-naphthyl)-α,α,1-trimethylcyclopentaneethanol proceeds by contacting (1S,2S,5S)-2-acetoxy-5-(1,2,3,4-tetrahydro-6-methoxy-1-oxo-2-naphthyl)-1-methylcyclopentaneacetic acid [J. Chem. Soc., Sec. C, 1968, 2603] with sodium tetrahydroborate(1-) in cold 2-propanol, heating the resultant (1S,2S,5S)-2-acetoxy-5-(1,2,3,4-tetrahydro-1-hydroxy-6-methoxy-2-naphthyl)-1-methylcyclopentaneacetic acid and/or corresponding lactone with selenous acid in ethanol, esterifying the (1S,2S,5S)-2-acetoxy-5-(1,2,3,4-tetrahydro-6-methoxy-2-naphthyl)-1-methylcyclopentane acetic acid thus obtained with diazomethane in cold ethyl ether, contacting the ester with methylmagnesium bromide in ethyl ether, and finally hydrolyzing the resultant Grignard complex with dilute hydrochloric acid to produce the desired product.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A.

(1S,2S,5S)-2-Acetoxy-5-(1,2,3,4-tetrahydro-1-hydroxy-6-methoxy-2-naphthyl)-1-methylcyclopentaneacetic acid and corresponding lactone To a stirred solution of approximately 10 parts of (1S,2S,5S)-2-acetoxy-5-(1,2,3,4-tetrahydro-6-methoxy-1-oxo-2-naphthyl)-1-methylcyclopentaneacetic acid in 160 parts of 2-propanol at around 5° is added 2 parts of sodium tetrahydroborate(1-). Stirring at 5° is continued for 1 hour, whereupon the reaction mixture is allowed to stand at room temperatures for 15 hours. At this point, 2 parts of glacial acetic acid is introduced; and the resultant mixture is stripped of liquid by vacuum distillation. To the residue is added 500 parts of water. The oily component of the 2-phase mixture thus obtained solidifies on stirring. The solid is collected on a filter, washed thereon with water, and dried in air. This product is a mixture of (1S,2S,5S)-2-acetoxy-5-(1,2,3,4-tetrahydro-1-hydroxy-6-methoxy-2-naphthyl)-1-methylcyclopentaneacetic acid and the corresponding lactone.

B. (1S,2S,5S)-2-Acetoxy-5-(1,2,3,4-tetrahydro-6-methoxy-2-naphthyl)-1-methylcyclopentaneacetic acid To a solution of 10 parts of (1S,2S,5S)-2-acetoxy-5-(1,2,3,4-tetrahydro-1-hydroxy-6-methoxy-2-naphthyl)-1-methylcyclopentaneacetic acid, alone or admixed with the corresponding lactone as isolated in Example 1A, in 120 parts of ethanol is added 5 parts of selenous acid. The resultant mixture is heated at the boiling point under reflux for 1 ½ hours, whereupon insoluble solids are filtered out and the filtrate stripped of solvent by vacuum distillation. The residue is mixed with 1,000 parts of water, then allowed to stand at 5° for 1 hour. Insoluble solids are filtered out, washed with water, and dried in air. The product thus isolated is (1-S,2S,5S)-2-acetoxy-5-(1,2,3,4-tetrahydro-6-methoxy-2-naphthyl)-1-methylcyclopentaneacetic acid which, recrystallized from ether, melts at approximately 151°–152°.

C. Methyl (1S,2S,5S)-2-acetoxy-5-(1,2,3,4-tetrahydro-6-methyl-2-naphthyl)-1-methylcyclopentaneacetate To a mixture of 6 parts of (1S,2S,5S)-2-acetoxy-5-(1,2,3,4-tetrahydro-6-methoxy-2-naphthyl)-1-methylcyclopentaneacetic acid and 70 parts of ether is added 3 volumes of an ice-cold solution of diazomethane in ethyl ether prepared from 35 parts of N-nitrosomethylurea, 280 parts of ethyl ether, 70 parts of potassium hydroxide, and 70 parts of water according to the procedure described in Org. Syn., Coll. Vol. 2, page 165 (1943). The resultant mixture is maintained at 5° for 2 hours with occasional stirring, whereupon insoluble solids are removed by filtration. The filtrate is stripped of solvent by vacuum distillation, and the residual oil is crystallized from a mixture of ether and hexane to give methyl (1S,2S,5S)-2-acetoxy-5-(1,2,3,4-tetrahydro-6-methoxy-2-naphthyl)-1-methylcyclopentaneacetate melting at 79.5°–84.5°.

D. (1S,2S,5S)-2-hydroxy-5-(6-methoxy-2-naphthyl)-α,α,1-trimethylcyclopentaneethanol To a solution of 10 parts of methyl (1S,2S,5S)-2-acetoxy-5-(1,2,3,4-tetrahydro-6-methoxy-2-naphthyl)-1-methylcyclopentaneacetate in 175 parts of anhydrous ethyl ether is added a solution of 36 parts of methylmagnesium bromide in 70 parts of anhydrous ethyl ether. The resultant mixture is stirred at room temperatures for 15 hours, whereupon 250 parts of water is carefully introduced. The mixture thus obtained is acidified with 5 percent hydrochloric acid. The ether phase is then separated, washed with water, dried over anhydrous sodium sulfate, and stripped of solvent by vacuum distillation. The residue is (1S,2S,5-S)-2-hydroxy-5-(6-methoxy-2-naphthyl)-α,α,1-trimethylcyclopentaneethnaol which, crystallized from a mixture of ether and hexane, is a colorless solid melting at 188°–190°.

What is claimed is:

1. (1S,2S,5S)-2-hydroxy-5-(6-methoxy-2-naphthyl)-α,α,1-trimethylcyclopentaneethanol.

* * * * *